July 6, 1954  E. C. FROST  2,683,005
AIRPLANE WITH DETACHABLE CARGO COMPARTMENT
Filed Jan. 18, 1951  3 Sheets-Sheet 1
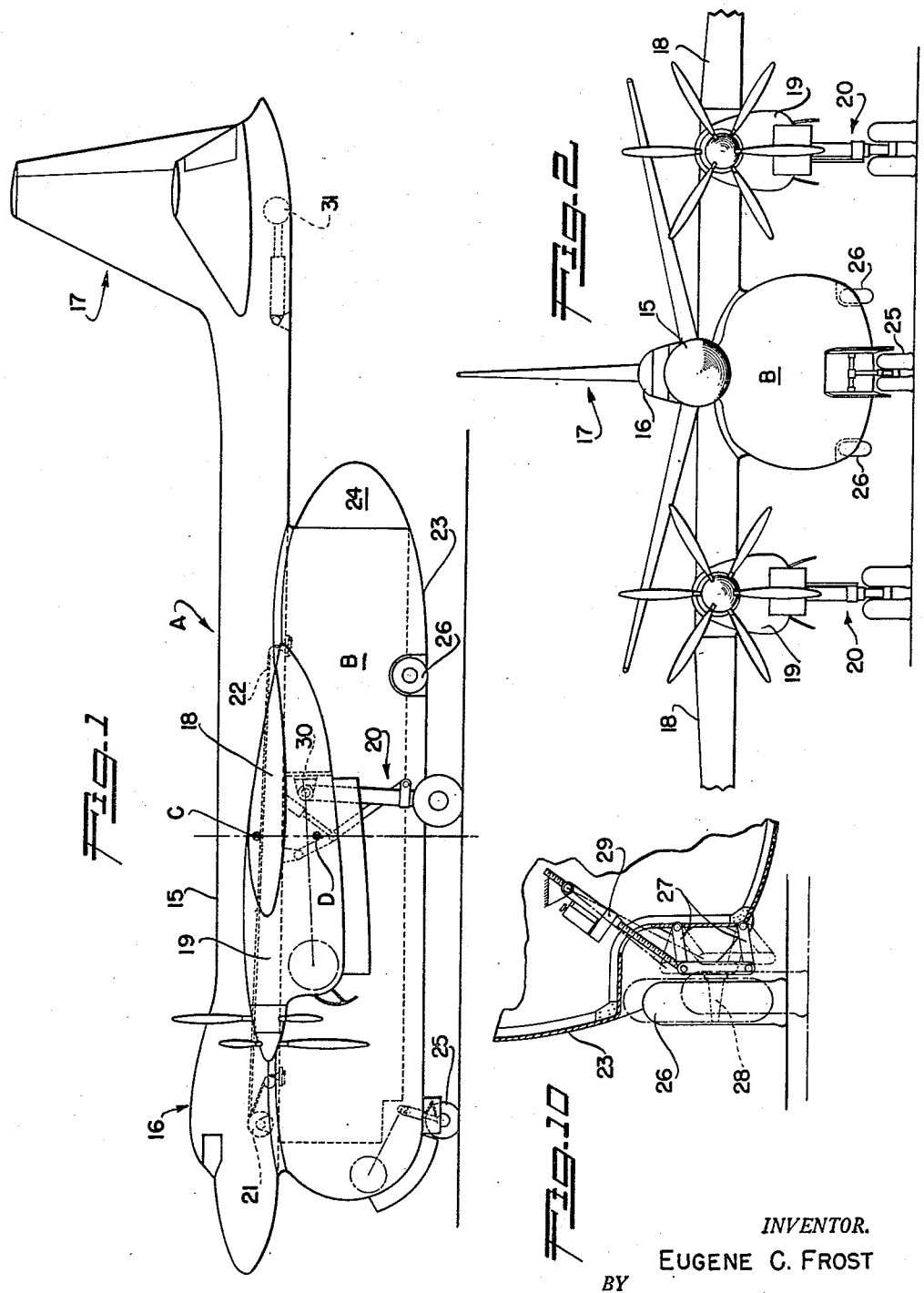
INVENTOR.
EUGENE C. FROST
BY
George C. Sullivan
Agent July 6, 1954  E. C. FROST  2,683,005
AIRPLANE WITH DETACHABLE CARGO COMPARTMENT
Filed Jan. 18, 1951  3 Sheets-Sheet 2
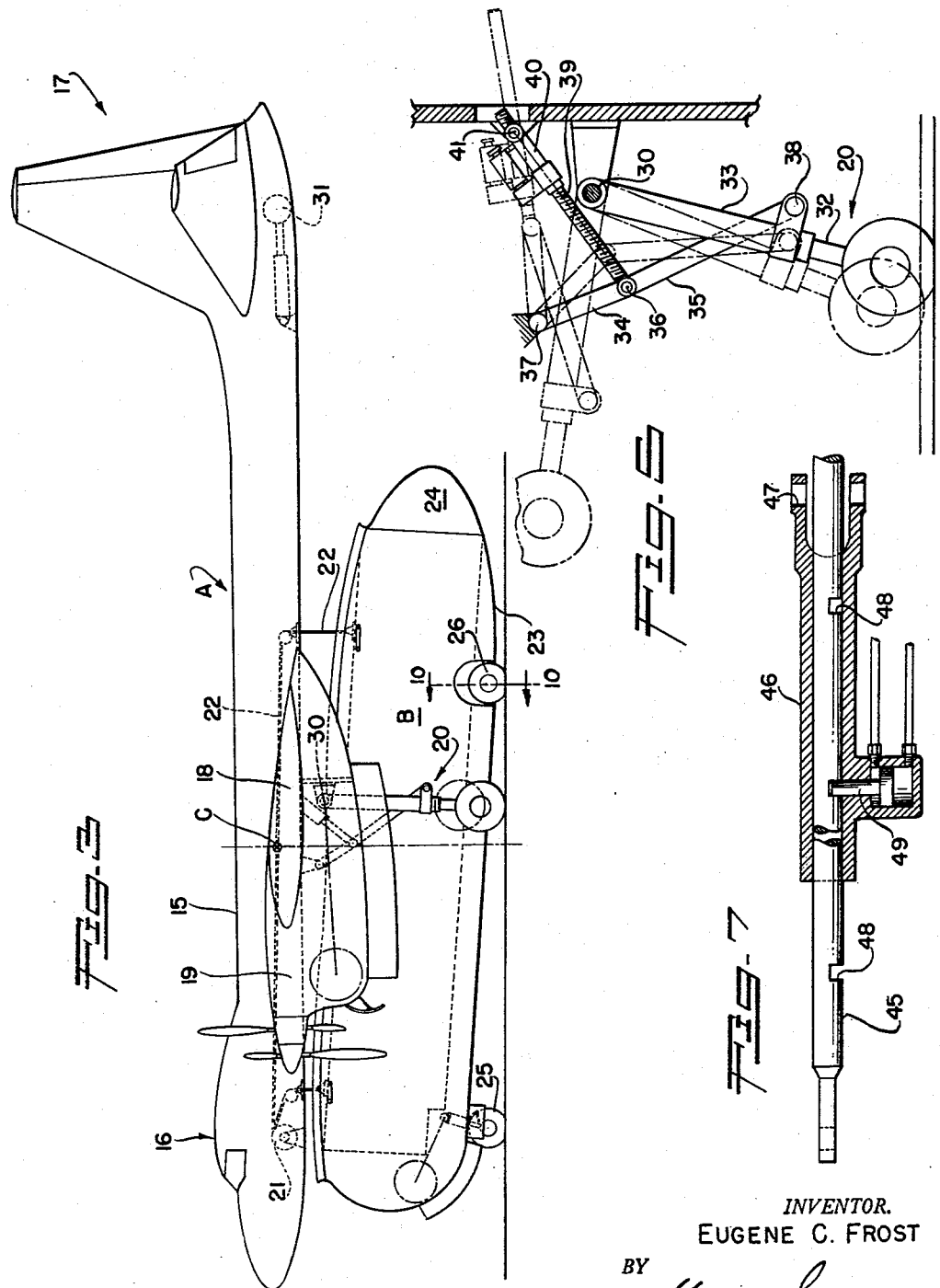
INVENTOR.
EUGENE C. FROST
BY
George C Sullivan
Agent

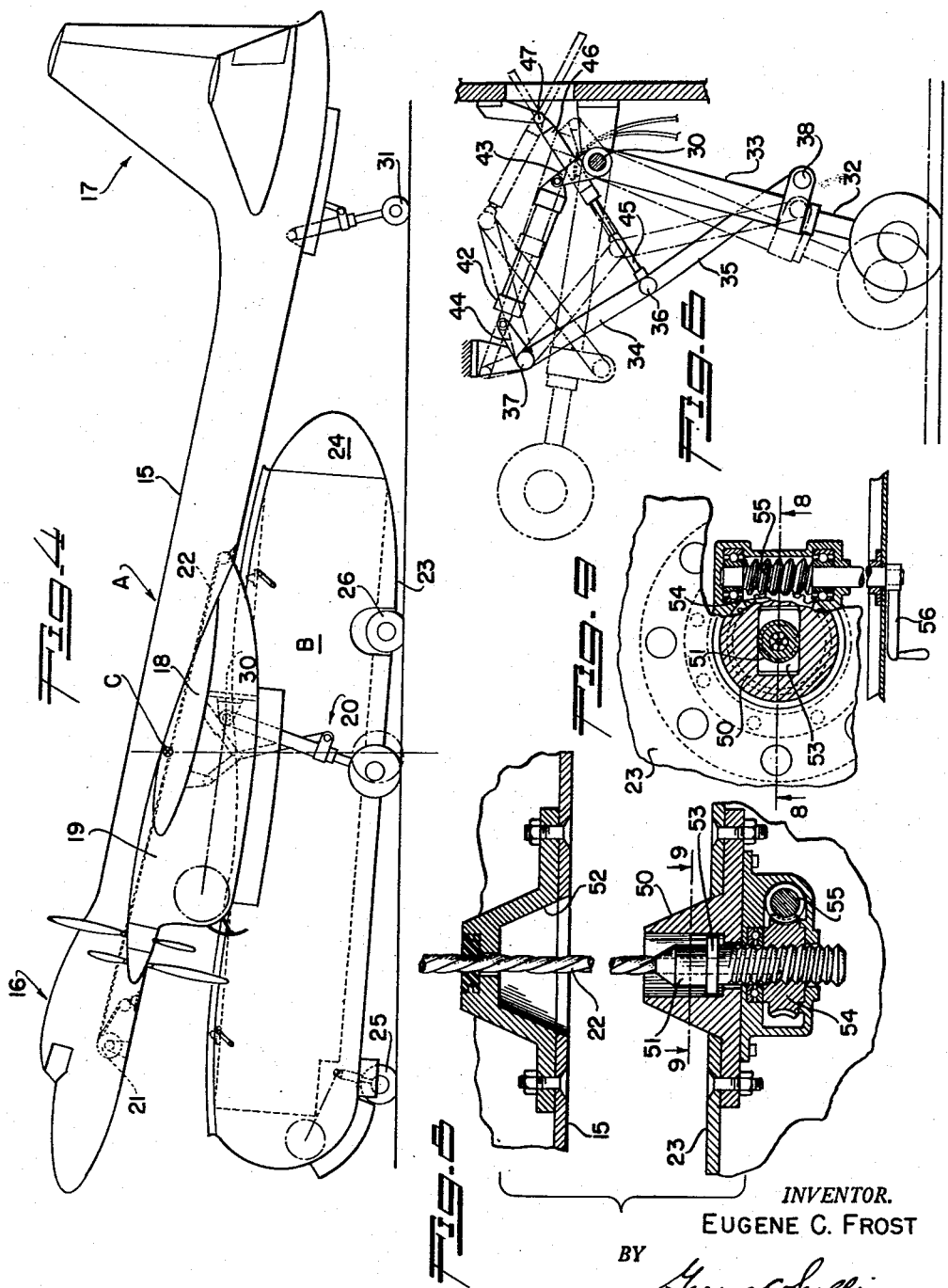

UNITED STATES PATENT OFFICE 2,683,005

AIRPLANE WITH DETACHABLE CARGO COMPARTMENT

Eugene C. Frost, Burbank, Calif., assignor to Lockheed Aircraft Corporation, Burbank, Calif.

Application January 18, 1951, Serial No. 206,655

8 Claims. (Cl. 244—118)

This invention relates to an improved and simplified combination of an airplane and a detachable cargo pod. The landing gear for the combination is a tricycle arrangement with the nose gear on the pod, while when the airplane is operated without the pod its main landing gear is moved forward to operate with a tail wheel carried by the aircraft component.

Many attempts have heretofore been made to develop an airplane and detachable and roadable cargo pod combination; the greatest difficulty being encountered in connection with the landing gear for the combination, and for the airplane when operating without the cargo pod. One solution, disclosed in the application of George C. Sullivan, Serial No. 494,269, filed July 12, 1943, now United States Letters Patent No. 2,577,287, utilizes a nose landing wheel on the cargo pod cooperating with main landing gears carried by the airplane, with auxiliary gear in front of and in line with the latter providing a four-wheel landing gear for the airplane when operating without the pod. Suggestions have also been made to use a tricycle gear with a long nose strut attached to the airplane in front of the compartment, or a four-wheel gear also attached to the airplane. In either case the landing gear components are stressed to land the combination of airplane and pod.

It is an object of this invention to provide a tricycle gear with the nose gear on the pod, as in the Sullivan patent above referred to, and to convert the main landing gears into a tail wheel combination for operation of the airplane alone. This involves moving the main gear wheels to the rear of the combined center of gravity when operating with the pod nose gear as a tricycle gear arrangement wherein the airplane and the pod are substantially level with the ground; and to move the main landing gear wheels ahead of the airplane center of gravity and tilting the airplane backwards to operate with a tail wheel when the pod is detached. This arrangement greatly facilitates the attachment and removal of the pod and increases the allowable size and utility of the latter as compared with a pod used with a long nose wheel or four-wheel type of gear carried by the airplane for this combination. This arrangement also permits use of a "box-car" type of pod with all of the advantages of level loading and front access thereto for placement and removal relative to the airplane component or "tug."

It is another object of this invention to provide an improved and simplified airplane and detachable cargo pod combination wherein the attachment and disengagement of the pod is accomplished by correlated movements of both components to facilitate engagement and disengagement therebetween; and removal from or placement of the pod in proper position relative to the airplane.

It is a further object of this invention to provide in the beforementioned combination main landing gear adjustment relative to the center of gravity of the combination or airplane alone in order to facilitate the operation of the airplane and the engagement or disengagement of the pod to or from the airplane. Control of the airplane static stability and ground attitude during such operations can be achieved without supplementary ground-handling equipment such as supports and/or jacks.

It is also an object of this invention to provide an improved airplane and detachable cargo pod combination wherein hoisting means inherently provide for proper alignment of the compartment with the airplane, and control the attitude of the airplane during the engagement and disengagement of the pod.

Other objects and features of the invention will be readily understood from the following detailed description of a typical preferred form of the invention wherein reference will be made to the accompanying drawings in which:

Figure 1 is a side view of an airplane and detachable cargo pod combination embodying the features of this invention, shown in the ground position of the assembled combination, wherein the combination is supported by a tricycle landing gear having a nose wheel on the cargo pod;

Figure 2 is a front view of the central part of the airplane of Figure 1, the wing tips being broken away;

Figure 3 is a side view similar to Figure 1 wherein the cargo pod has been lowered so that the partially extended rear wheels carried by the pod take the load thereof in cooperation with the nose wheel of the tricycle landing gear, the airplane component being maintained in level attitude, balanced on its main landing gear by suitable control of the compartment hoisting mechanism;

Figure 4 is a side view forming a continuation of Figures 1 and 2 in that the main landing gears have been moved ahead of the center of gravity, and the airplane component has been tilted back to rest on the main gear and an extended tail wheel under control of the compartment hoisting mechanism, shown detached in this view;

Figure 5 is a detail of a mechanical and electrical control for variably positioning and retracting the main landing gears;

Figure 6 is a detail of an alternative hydraulic form of control of the main gear positioning;

Figure 7 is a fragmentary detail of a jury strut for the hydraulic mechanism of Figure 6, embodying up and down locks and an intermediate lock for the position wherein the landing gear is shifted ahead of the center of gravity of the airplane;

Figure 8 is an enlarged detail of the compartment hoist engaging and aligning mechanism;

Figure 9 is a section on the line 9—9 of Figure 8 showing the cable engaging mechanism carried by the compartment; and Figure 10 is a detail of the cargo pod rear wheels, taken on the line 10—10 of Figure 3.

As shown on the drawings, an airplane, generally designated by the reference A, comprises a fuselage 15 having a pilot's compartment 16 near its nose and conventional empennage surfaces 17 at its tail; has wings 18 carrying powerplant nacelles 19 and main landing gears 20 retractable into the nacelles. The airplane, per se, is intended to be flyable with or without a cargo pod, generally designated by the reference B, and, therefore, is preferably merely a tug embodying power units, fuel tanks and flying controls without other provisions except for the flying crew. Accordingly, the fuselage may be rather slender for its length, with suitable hoisting mechanism 21 and hoisting cables 22 for lifting a loaded cargo pod into place against the lower surface of the fuselage.

It is desirable in this connection that the center of gravity of the pod approximately coincide with that of the airplane alone, designated as C, so that the center of gravity of the combination of loaded compartment and airplane, designated as D, will fall within the permissible center of gravity travel of the combination. However, if desired, either C or the particular cargo loading may be arranged so that the resultant D falls within the permissible limits, usually a range of approximately 20 to 35% of the mean aerodynamic chord of the wing of the airplane component A.

The cargo pod D comprises a partially streamlined shell 23 having the maximum available cargo loading space, desirably level floored and box-like in section. Loading access thereto may be had through clam shell rear doors 24. A retractable nose wheel 25 for landing the airplane and pod combination is shown mounted beneath the compartment, and variably extensible rear wheels 26 are carried toward the rear of the pod, shown in detail in Figure 10 as involving a parallel linkage mounting 27 supporting a wheel spindle 28 and controlled by an electrically driven jack 29 resembling a cowl flap actuator. With this arrangement the rear wheels 26 may be retracted as in Figure 1, partially extended as in Figures 3 and 4 to facilitate removal or placement of the compartment beneath the airplane, or fully extended to improve the roadability of the pod, and to bring the floor line thereof level with the ground. The compartment may be towed by the use of a conventional tow bar attached to the nose wheel 25; or the nose wheel may be retracted and the front end carried by the usual tractor fifth wheel, as shown in the Sullivan application previously referred to.

When using the pod nose wheel 25 as part of the tricycle landing gear of the combination the main landing gears 20 are fully extended into a ground contact position to the rear of a vertical line through the center of gravity D of the combination, as in Figure 1, thus supporting the combination in the same fashion as a conventional tricycle landing gear.

The main landing gears 20 are retractable into the powerplant nacelles 19, swinging forwardly and upwardly about a pivot 30 carried by a structural member of the airplane wing or nacelle. Since it is desired to adjust the main gears 20 either to the rear of the center of gravity D to cooperate with the nose gear 25 to form a tricycle landing gear for the combination, or to a position in front of the center of gravity C for cooperation with a retractable tail wheel 31 carried by the airplane; two methods of controlling the ground contact points of the main gears 20 are shown in Figures 5 and 6. The former relates to a mechanical and electrical system and the latter to a hydraulic system, in both cases also providing for complete gear retraction.

In both Figures 5 and 6 the main landing wheels 20 are shown as carried by the piston 32 of a shock absorber strut 33 of the pneumatic and oleo type, the upper end of the strut being pivoted at 30 as above mentioned. A drag strut is shown comprising two links 34 and 35 pivoted together at 36, with the link 34 pivoted to the airplane structure at 37 and the link 35 pivoted to the strut at 38. The structure so far described is common to both figures.

In Figure 5 a jack screw 39 forming a jury strut is pivoted at one end of the pivot 36 between the links 34 and 35, and is extended or retracted by suitable motor driven mechanism in a housing 40 pivoted at 41 to structure near the strut pivot 30. The mechanism and jack screw may be substantially similar to those actuators well known in the art, being inherently self-locking in any adjusted position to provide both up and down locks as well as an intermediate lock to position the main gear for cooperation with the tail wheel; or by further movement to substantially lower the front of the airplane when the cargo compartment is out of the way. Such further movement ahead of the center of gravity C can achieve an attitude for the airplane necessary for tail-wheel type operation, as distinguished from the initial forward movement for static balance of the airplane component A during the placing and removal of the pod B.

The hydraulic version of Figure 6 applies only to the hydraulic actuation thereof plus a hydraulic lock incorporated in a jury strut shown in Figure 7. For hydraulic control of the strut extension and retraction a hydraulic cylinder and piston combination 42 is pivoted between lever arm extensions 43 and 44 rigid with the strut 33 and upper link 34 respectively, in such a manner that shortening of the effective length of the hydraulic cylinder between its pivots acts to extend the landing gear, and vice versa. When retracting or extending the gear this arrangement acts to start pivotal motion of the link 34, and also results in movement of a jury strut rod 45, pivoted to the links at 36, through a bracket 46 pivoted at 47 to fixed structure, the rod 45 having notches 48 for the up and down lock positions, and one or more additional notches for the forward position of the landing gear. The notches 48 in the rod 45 are engaged by a hydraulically operated detent 49 which serves to lock the jury strut to in turn hold the links 34 and 35 in the several selected positions, as indicated in dotted lines in Figure 6.

The cables 22, previously referred to, for hoisting the compartment into place beneath the airplane, may be attached to and released from the pod as shown in Figures 8 and 9 wherein the pod attachment includes a cone-like member 50 centrally apertured to receive a threaded cable end member 51, the cone-like member 50 being drawn up and seated in a complementary conical recess 52 in the airplane structure to locate the compartment relative to the aircraft, and to prevent relative shifting therebetween. The cable end member 51 carries a rectangular key-like member 53 entering a corresponding enlargement of the central aperture in the cone-like member 50, to prevent rotation of the member 51 when it is being drawn down into the member 51 by a worm gear nut 54 driven by a worm 55 in turn actuated by a removable hand crank 56. Since four hoisting cables 22 may be simultaneously actuated by the hoist 21, the worm 55 and worm gear 56 may be used to equalize minor variations in cable tension after the compartment has been hoisted into place.

As previously mentioned, the pod wheels 26 may be only partially extended during the engagement or disengagement of the pod B, in order to provide additional clearance between the rear top edges of the compartment and the bottom of the airplane A while the latter is being tilted to or from the tail-wheel type of landing gear arrangement, used when the airplane alone is maneuvered on the ground or for take-off and landing. A schematic method of a suitable variable extension wheel mechanism is shown in Figure 10 where parallel links 27 support a spindle 28 for the wheel 26, and the variable extension and retraction of the wheel is under the control of geared jack screw mechanism 29 resembling the actuator also used on the main gear in Figure 5.

The operation of engaging or disengaging the pod B from the airplane A is best described in connection with the sequence of disengagement progressively shown in Figures 1, 3 and 4. Figure 1 in effect is the static fully loaded position of the combination, wherein the nose wheel 25 and main landing gears 20 form a tricycle landing gear supporting the combination in a level position relative to the ground. Since the nose wheel 25 is carried by the pod in order to avoid a long strut supported by the aircraft nose, or alternatively a four-wheel gear for the airplane alone as in the Sullivan application previously referred to; the removal of the pod would leave the airplane unbalanced and nose heavy because the main gears 20 are positioned to the rear of a vertical line through the center of gravity C in the tricycle landing gear arrangement. Accordingly, when the hoist 21 is operated to lower the weight of the compartment B onto the nose wheel in combination with the compartment rear wheels 26, the cables 22 are not entirely slacked off, but sufficient strain is kept on the rear cables to hold the airplane A in balance in the level position of Figure 3. This is possible because the main landing gear wheels are not far behind the center of gravity in the tricycle gear version.

When most of the pod weight has been transferred to the ground, the release of this weight from the airplane A and the main landing gears 20 allows the strut pistons 32 thereof to substantially extend from the static full load position, shown in dotted lines in Figure 3, to a further extended position, in effect lifting the airplane A by the difference in strut length. Such unloading of the main landing gears 20 increases the working clearance of the airplane relative to the pod and facilitates the movement of the main landing gears to a position ahead of the center of gravity C of the airplane, as shown in Figure 4. This movement renders the airplane tail heavy thus shifting the balancing load to the front cables in Figure 3 so that slackening off on the cables allows the airplane to tilt backwardly until supported by its extended tail wheel 31, whereupon the cables can be disconnected from the pod. The latter may now be readily pulled forward and its rear wheels thereafter fully extended for additional ground clearance of the pod; also to substantially level the pod for ease of loading and unloading.

The reverse operation of attaching the pod to the airplane starts with Figure 4. After attaching the hoisting cables 22 as shown in the details of Figures 8 and 9, the airplane is pulled into level position thereby, the main landing gears are moved back to the position of Figure 3, and the pod hoisted into place, as in Figure 1. It will be noted that the main landing gears 20 are moved relative to the center of gravity only when substantially relieved of the weight of the compartment, so that the jury strut of either Figure 5 or 6 is not subject to the full force that might otherwise be developed if the reaction of the weight of the combination had to be carried through the links 34 and 35 in other than their substantially straight position. Also, the main gear can be moved farther ahead of the center of gravity A to lower the front end of the airplane after the pod is removed to permit operation as a normal tail-wheel type airplane.

It will thus be seen that I have invented an improved and simplified airplane and detailed cargo pod combination wherein the combination operates with a tricycle landing gear arrangement, while the airplane alone operates with a tail wheel landing gear, the switch over being made by moving the main landing gears from one side to the other of the center of gravity of the combination or the airplane alone; such moving being accomplished under partial loading conditions and under the control of the pod hoisting arrangement.

Having thus described my invention and the present preferred embodiments thereof, I desire to emphasize the fact that many modifications may be resorted to in a manner limited only by a just interpretation of the following claims.

I claim:

1. An airplane and detachable suspended cargo pod combination having a tricycle landing gear arrangement comprising a nose landing gear carried beneath the front end of the pod, main landing gears attached to the airplane itself, means for shifting the ground contact point of said main landing gears from behind to in front of the center of gravity of said combination, and a tail wheel carried by the airplane itself for cooperation with said main landing gears when the latter are shifted ahead of the center of gravity, whereby to provide for ground maneuvering and flight of the airplane component of the combination when the cargo pod has been removed.

2. An airplane and detachable suspended cargo pod combination having a tricycle landing gear arrangement comprising a nose landing gear carried beneath the front end of the pod, main landing gears attached to the airplane itself, means for shifting the ground contact point of said main landing gears by pivoting the same from behind to in front of the center of gravity of said combination, a tail wheel carried by the airplane itself for cooperation with said main landing gears when the latter are shifted ahead of the center of gravity, whereby to provide for ground maneuvering and flight of the airplane component of the combination when the cargo pod has been removed, and hoisting means for lifting said pod into position against the airplane, said hoisting means including separately operable fore and aft connections to said pod arranged to control the balance and attitude of said airplane during the shifting movement of said main landing gears.

3. An airplane and detachable suspended cargo pod combination having a tricycle landing gear arrangement comprising a nose landing gear carried beneath the front end of the pod, main landing gears attached to the airplane itself, means for pivotally moving the ground contact point of said main landing gears from behind to in front of the center of gravity of said combination, a tail wheel carried by the airplane itself for cooperation with said main landing gears when the latter are shifted ahead of the center of gravity, whereby to provide for ground maneuvering and flight of the airplane component of the combination when the cargo pod has been removed, hoisting means for lifting said pod into position against the airplane, said hoisting means including separately operable fore and aft connections to said pod arranged to control the balance and attitude of said airplane during the movement of said main landing gears, and interengaging means associated with said hoisting means arranged to locate said pod in fixed relation to the airplane.

4. In combination, an airplane of the high wing type having powerplant nacelles carried by said wings, a detachable cargo pod centrally located below said airplane and between said nacelles, means detachably connecting said cargo pod to said airplane, hoisting means for said pod associated with said last mentioned means, landing gears for the combination of airplane and compartment and for the airplane alone, comprising main landing gears beneath the nacelles, a nose landing gear beneath the pod, a tail wheel carried by the airplane, and means for moving the main landing gears to the rear of the center of gravity of the airplane to cooperate with said nose wheel when the pod is in position, and forwardly of the center of gravity of the airplane to cooperate with said tail wheel when the pod is detached.

5. The combination of claim 4 wherein the hoisting means is further arranged to control the attitude of the airplane while said main landing gear is being moved.

6. In an airplane and detachable cargo pod combination wherein the airplane is flyable with or without the pod, means for hoisting and attaching said pod into position beneath said airplane with the combined center of gravity of the combination in substantial vertical alignment with the center of gravity of the airplane alone, a landing gear for said combination including a wheel on said cargo pod and a pair of wheels on said airplane arranged on opposite sides of said cargo pod and disposed rearwardly of the wheel on said cargo pod, said landing wheels being arranged to support said combination in a substantially level attitude when said airplane is on the ground, a tail wheel on said airplane to the rear of said pair of wheels and arranged in cooperation with the latter to support said airplane alone at an inclined nose-up attitude, and variably extensible auxiliary wheels on said cargo pod cooperable with the wheel on said cargo pod to lift said pod to facilitate removal thereof from beneath said airplane and render said cargo pod roadable.

7. The combination of claim 6 wherein the pair of wheels on said airplane are further arranged to move the ground contact point thereof forward of or to the rear of the vertical line through the centers of gravity of the airplane alone and of the combination.

8. In an airplane and cargo pod combination wherein the pod is detachably suspended beneath the airplane in substantially vertical alignment with the center of gravity of the airplane alone, a tricycle landing gear for the combination comprising dual position main wheels carried by the airplane and adjustable to either forward or aft of vertical alignment with the center of gravity, a nose wheel carried by the pod for cooperation with the main wheels when the latter are disposed aft of vertical alignment with the center of gravity, and a tail wheel carried by the airplane for cooperation with said main wheels when the latter are disposed forward of vertical alignment with the center of gravity.

References Cited in the file of this patent

UNITED STATES PATENTS

| Number | Name | Date |
|---|---|---|
| 2,075,042 | Knerr | Mar. 30, 1937 |
| 2,448,862 | Conklin | Sept. 7, 1948 |
| 2,463,346 | Akerman | Mar. 1, 1949 |
| 2,514,045 | Gardenhire | July 4, 1950 |
| 2,597,563 | Beazeale | May 20, 1952 |

FOREIGN PATENTS

| Number | Country | Date |
|---|---|---|
| 506,528 | Great Britain | May 30, 1939 |
| 575,532 | Great Britain | Feb. 21, 1946 |
| 598,813 | Great Britain | Feb. 26, 1948 |